United States Patent
Valenzuela et al.

(10) Patent No.: US 12,454,111 B2
(45) Date of Patent: Oct. 28, 2025

(54) TOOL TO MANUFACTURE A CUSHION

(71) Applicant: Lear Corporation, Southfield, MI (US)

(72) Inventors: Ibrahim Valenzuela, Novi, MI (US); Haifeng Liu, Southfield, MI (US); Lisa Swikoski, Southfield, MI (US); Kevin M. Geisler, Southfield, MI (US); Michelle A. Pereny, Farmington Hills, MI (US); Jeanene F. Munroe, Southfield, MI (US)

(73) Assignee: Lear Corporation, Southfield, MI (US)

(*) Notice: Subject to any disclaimer, the term of this patent is extended or adjusted under 35 U.S.C. 154(b) by 237 days.

(21) Appl. No.: 17/741,639

(22) Filed: May 11, 2022

(65) Prior Publication Data
US 2023/0364876 A1 Nov. 16, 2023

(51) Int. Cl.
| | |
|---|---|
| B29D 99/00 | (2010.01) |
| B29C 48/05 | (2019.01) |
| B29C 48/345 | (2019.01) |
| B29C 48/88 | (2019.01) |
| B29C 48/90 | (2019.01) |
| D04H 3/037 | (2012.01) |

(52) U.S. Cl.
CPC .......... B29D 99/0092 (2013.01); B29C 48/05 (2019.02); B29C 48/345 (2019.02); B29C 48/905 (2019.02); D04H 3/037 (2013.01); B29C 48/919 (2019.02)

(58) Field of Classification Search
CPC ..... B29C 48/05; B29C 48/345; B29C 48/919; B29C 48/905; D04H 3/037
See application file for complete search history.

(56) References Cited

U.S. PATENT DOCUMENTS

| | | | |
|---|---|---|---|
| 1,621,008 | A | 3/1927 | Fricker |
| 2,130,935 | A | 9/1938 | Thompson |
| 2,188,995 | A | 2/1940 | Avery et al. |
| 2,630,938 | A | 3/1953 | Burnett |
| 2,630,968 | A | 3/1953 | Muskat |
| 3,155,363 | A | 11/1964 | Lohr |
| 3,309,052 | A | 3/1967 | Borisof |
| 3,315,283 | A | 4/1967 | Larsen |
| 3,630,572 | A | 12/1971 | Homier |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS

Translation of JP-2020045589-A (Year: 2020).*

(Continued)

*Primary Examiner* — John J DeRusso
(74) *Attorney, Agent, or Firm* — Brooks Kushman P.C.

(57) ABSTRACT

A method of manufacturing a product, dispenses, through a tool with an aperture sized to match an overall perimeter of a product, a molten thermoplastic resin. The tool generates a plurality of strands through the tool aperture while maintaining the plurality of strands within the overall perimeter of the product. The strands are buckled by resisting a flow of the plurality of strands. The buckled strands intersect as a unitary non-woven body in a shape of the overall perimeter of the product.

9 Claims, 2 Drawing Sheets

(56) References Cited

U.S. PATENT DOCUMENTS

| | | |
|---|---|---|
| 3,689,620 A | 9/1972 | Miyazaki et al. |
| 3,733,658 A | 5/1973 | Mitchell |
| 3,794,378 A | 2/1974 | Haslam et al. |
| 3,861,747 A | 1/1975 | Diamond |
| D239,147 S | 3/1976 | Karlsen |
| 3,961,823 A | 6/1976 | Caudill, Jr. |
| 4,012,249 A | 3/1977 | Stapp |
| 4,031,579 A | 6/1977 | Larned |
| 4,264,556 A | 4/1981 | Kumar et al. |
| 4,287,657 A | 9/1981 | Raymond |
| 4,396,823 A | 8/1983 | Nihei et al. |
| 4,476,594 A | 10/1984 | McLeod |
| 4,563,387 A | 1/1986 | Takagi et al. |
| 4,663,211 A | 5/1987 | Kon |
| 4,751,029 A | 6/1988 | Swanson |
| 4,786,351 A | 11/1988 | Elliott et al. |
| 4,859,516 A | 8/1989 | Yamanaka et al. |
| 4,860,402 A | 8/1989 | Dichtel |
| 4,876,135 A | 10/1989 | McIntosh |
| 4,881,997 A | 11/1989 | Hatch |
| 4,900,377 A | 2/1990 | Redford et al. |
| 4,913,757 A | 4/1990 | Yamanaka et al. |
| 4,933,224 A | 6/1990 | Hatch |
| 4,952,265 A | 8/1990 | Yamanaka et al. |
| 4,953,770 A | 9/1990 | Bond, Sr. |
| 5,003,664 A | 4/1991 | Wong |
| 5,007,676 A | 4/1991 | Lien |
| 5,016,941 A | 5/1991 | Yokota |
| 5,051,226 A | 9/1991 | Brustad et al. |
| 5,092,381 A | 3/1992 | Feijin et al. |
| 5,095,592 A | 3/1992 | Doerfling |
| 5,313,034 A | 5/1994 | Grimm et al. |
| 5,378,296 A | 1/1995 | Vesa |
| 5,381,922 A | 1/1995 | Gladman et al. |
| 5,405,178 A | 4/1995 | Weingartner et al. |
| D364,269 S | 11/1995 | Sabosky |
| 5,464,488 A | 11/1995 | Servin |
| 5,464,491 A | 11/1995 | Yamanaka |
| 5,482,665 A | 1/1996 | Gill |
| 5,492,662 A | 2/1996 | Kargol et al. |
| 5,494,627 A | 2/1996 | Kargol et al. |
| 5,536,341 A | 7/1996 | Kelman |
| 5,551,755 A | 9/1996 | Lindberg |
| 5,569,641 A | 10/1996 | Smith |
| 5,586,807 A | 12/1996 | Ishikawa et al. |
| 5,587,121 A | 12/1996 | Vesa |
| 5,605,373 A | 2/1997 | Wildern, IV et al. |
| 5,620,759 A | 4/1997 | Insley et al. |
| 5,622,262 A | 4/1997 | Sadow |
| 5,639,543 A | 6/1997 | Isoda et al. |
| 5,669,129 A | 9/1997 | Smith et al. |
| 5,669,799 A | 9/1997 | Moseneder et al. |
| 5,679,296 A | 10/1997 | Kelman et al. |
| 5,685,050 A | 11/1997 | Murasaki |
| 5,715,581 A | 2/1998 | Akeno |
| 5,733,825 A | 3/1998 | Martin et al. |
| 5,788,332 A | 8/1998 | Hettinga |
| 5,811,186 A | 9/1998 | Martin et al. |
| 5,819,408 A | 10/1998 | Catlin |
| 5,833,321 A | 11/1998 | Kim et al. |
| 5,966,783 A | 10/1999 | Genereux et al. |
| 6,010,766 A | 1/2000 | Braun et al. |
| 6,057,024 A | 5/2000 | Mleziva et al. |
| 6,063,317 A | 5/2000 | Carroll, III |
| 6,131,220 A | 10/2000 | Morimura |
| 6,272,707 B1 | 8/2001 | Robrecht et al. |
| 6,283,552 B1 | 9/2001 | Halse et al. |
| 6,302,487 B1 | 10/2001 | Fujita et al. |
| 6,347,790 B1 | 2/2002 | Nishibori et al. |
| 6,378,150 B1 | 4/2002 | Minegishi et al. |
| D461,746 S | 8/2002 | Olson et al. |
| 6,457,218 B1 | 10/2002 | Lawrence |
| 6,537,483 B1 | 3/2003 | Cartwright et al. |
| 6,558,590 B1 | 5/2003 | Stewart |
| 6,668,429 B2 | 12/2003 | Fujisawa et al. |
| 6,766,201 B2 | 7/2004 | Von Arx et al. |
| 6,776,201 B2 | 8/2004 | Willis |
| 6,918,146 B2 | 7/2005 | England |
| 6,935,698 B1 | 8/2005 | Chen |
| D523,330 S | 6/2006 | Mattesky |
| 7,073,230 B2 | 7/2006 | Boville |
| 7,100,978 B2 | 9/2006 | Ekern et al. |
| D530,192 S | 10/2006 | Becerra |
| 7,128,371 B2 | 10/2006 | Kawasaki et al. |
| 7,141,768 B2 | 11/2006 | Malofsky et al. |
| 7,158,968 B2 | 1/2007 | Cardno et al. |
| D538,704 S | 3/2007 | Kaminski et al. |
| 7,290,300 B1 | 11/2007 | Khambete |
| 7,377,762 B2 | 5/2008 | Nishibori et al. |
| 7,427,103 B2 | 9/2008 | Weber |
| 7,481,489 B2 | 1/2009 | Demick |
| 7,506,939 B2 | 3/2009 | Borckschneider et al. |
| 7,547,061 B2 | 6/2009 | Horimatsu et al. |
| 7,549,707 B2 | 6/2009 | Brennan et al. |
| 7,622,179 B2 | 11/2009 | Patel |
| 7,625,629 B2 | 12/2009 | Takaoka |
| 7,669,925 B2 | 3/2010 | Beck et al. |
| 7,707,743 B2 | 5/2010 | Schindler et al. |
| 7,771,375 B2 | 8/2010 | Nishibori et al. |
| 7,837,263 B2 | 11/2010 | Booth et al. |
| 7,866,969 B2 | 1/2011 | Ruiz et al. |
| 7,892,991 B2 | 2/2011 | Yamanaka et al. |
| D636,293 S | 4/2011 | Dolce et al. |
| 7,946,649 B2 | 5/2011 | Galbreath et al. |
| 7,993,734 B2 | 8/2011 | Takaoka |
| 8,052,212 B2 | 11/2011 | Backendorf |
| 8,056,263 B2 | 11/2011 | Schindler et al. |
| 8,226,882 B2 | 7/2012 | Takaoka |
| 8,235,462 B2 | 8/2012 | Bajic et al. |
| 8,240,759 B2 | 8/2012 | Hobl et al. |
| 8,276,235 B2 | 10/2012 | Naughton |
| 8,277,210 B2 | 10/2012 | Takaoka |
| D677,193 S | 3/2013 | MacDonald |
| 8,563,121 B2 | 10/2013 | Takaoka |
| 8,563,123 B2 | 10/2013 | Takaoka |
| 8,568,635 B2 | 10/2013 | Takaoka |
| 8,721,825 B2 | 5/2014 | Takaoka |
| 8,752,902 B2 | 6/2014 | Labish |
| 8,757,996 B2 | 6/2014 | Takaoka |
| 8,828,293 B2 | 9/2014 | Takaoka |
| 8,882,202 B2 | 11/2014 | Petzel et al. |
| 8,932,692 B2 | 1/2015 | Pearce |
| 9,004,591 B2 | 4/2015 | Murasaki et al. |
| 9,009,792 B1 | 4/2015 | Scofield et al. |
| 9,097,921 B2 | 8/2015 | Ogasawara et al. |
| 9,168,854 B2 | 10/2015 | Ursino et al. |
| 9,169,585 B2 | 10/2015 | Takaoka |
| 9,174,404 B2 | 11/2015 | Takaoka |
| 9,179,748 B2 | 11/2015 | Esti |
| 9,194,066 B2 | 11/2015 | Takaoka |
| 9,283,875 B1 | 3/2016 | Pellettiere |
| 9,334,593 B2 | 5/2016 | Sasaki |
| 9,434,286 B2 | 9/2016 | Klusmeier et al. |
| 9,440,390 B2 | 9/2016 | Takaoka |
| 9,447,522 B2 | 9/2016 | Zikeli et al. |
| 9,456,702 B2 | 10/2016 | Miyata et al. |
| 9,487,117 B2 | 11/2016 | Steinmeier et al. |
| 9,528,209 B2 | 12/2016 | Takaoka |
| 9,561,612 B2 | 2/2017 | Takaoka |
| 9,598,803 B2 | 3/2017 | Takaoka |
| 9,615,670 B2 | 4/2017 | Takaoka |
| 9,616,790 B2 | 4/2017 | Stankiewicz et al. |
| 9,617,021 B2 | 4/2017 | McCorkle et al. |
| 9,669,744 B2 | 6/2017 | Cao et al. |
| 9,688,007 B2 | 6/2017 | Cheng |
| 9,708,067 B2 | 7/2017 | Wilson et al. |
| 9,751,442 B2 | 9/2017 | Smith |
| 9,771,174 B2 | 9/2017 | Murray |
| D798,875 S | 10/2017 | Huang |
| 9,789,796 B1 | 10/2017 | White |
| 9,809,137 B2 | 11/2017 | Kheil |
| 9,918,559 B2 | 3/2018 | Osaki |
| 9,918,560 B2 | 3/2018 | Osaki |
| 9,925,899 B2 | 3/2018 | Mogi et al. |

(56) References Cited

U.S. PATENT DOCUMENTS

| | | |
|---|---|---|
| 9,938,649 B2 | 4/2018 | Taninaka et al. |
| 9,970,140 B2 | 5/2018 | Taninaka et al. |
| 10,118,323 B2 | 11/2018 | Fujita et al. |
| 10,150,320 B2 | 12/2018 | Ellringmann et al. |
| 10,231,511 B2 | 3/2019 | Guyan et al. |
| 10,233,073 B2 | 3/2019 | Takaoka |
| 10,266,977 B2 | 4/2019 | Takaoka |
| 10,316,444 B2 | 6/2019 | Wakui et al. |
| 10,328,618 B2 | 6/2019 | Takaoka |
| 10,343,565 B2 | 7/2019 | Baek et al. |
| 10,398,236 B2 | 9/2019 | Achten et al. |
| 10,399,848 B2 | 9/2019 | Kristo et al. |
| 10,414,305 B2 | 9/2019 | Ishii et al. |
| 10,421,414 B2 | 9/2019 | Townley et al. |
| 10,457,175 B2 | 10/2019 | Lang et al. |
| 10,501,598 B2 | 12/2019 | Baldwin et al. |
| 10,604,040 B2 | 3/2020 | Clauser et al. |
| 10,618,799 B2 | 4/2020 | Shah et al. |
| 10,632,814 B2 | 4/2020 | Humer |
| 10,730,419 B2 | 8/2020 | Low et al. |
| 10,736,435 B2 | 8/2020 | Duncan et al. |
| 10,744,914 B2 | 8/2020 | Baek et al. |
| 10,750,820 B2 | 8/2020 | Guyan |
| RE48,225 E | 9/2020 | Kheil et al. |
| 10,780,805 B2 | 9/2020 | Kamata |
| 10,806,272 B2 | 10/2020 | Ando et al. |
| 10,821,862 B2 | 11/2020 | Russman et al. |
| 10,843,600 B2 | 11/2020 | Booth et al. |
| 10,882,444 B2 | 1/2021 | Townley et al. |
| 10,889,071 B2 | 1/2021 | Kojima et al. |
| 10,934,644 B2 | 3/2021 | Taninaka et al. |
| 11,007,761 B2 | 5/2021 | Ben-Daat et al. |
| 11,168,421 B2 | 11/2021 | Wakui et al. |
| 11,186,336 B2 | 11/2021 | Primeaux et al. |
| D948,764 S | 4/2022 | Peterson |
| 11,369,532 B2 | 6/2022 | Wilson et al. |
| 11,383,625 B2 | 7/2022 | Voigt et al. |
| 11,554,699 B2 | 1/2023 | Liau et al. |
| D1,005,380 S | 11/2023 | McWilliams et al. |
| 2001/0007166 A1 | 7/2001 | Shimamura et al. |
| 2002/0041949 A1 | 4/2002 | Nishibori et al. |
| 2002/0101109 A1 | 8/2002 | Stiller et al. |
| 2002/0193221 A1 | 12/2002 | Tisi |
| 2003/0026970 A1 | 2/2003 | Hernandez et al. |
| 2003/0032731 A1 | 2/2003 | Oswald et al. |
| 2003/0061663 A1 | 4/2003 | Lampel |
| 2003/0092335 A1 | 5/2003 | Takaoko |
| 2004/0036326 A1 | 2/2004 | Bajic et al. |
| 2004/0099981 A1 | 5/2004 | Gerking |
| 2004/0126577 A1 | 7/2004 | Lee et al. |
| 2004/0142619 A1 | 7/2004 | Ueno et al. |
| 2004/0255385 A1 | 12/2004 | England |
| 2005/0030011 A1 | 2/2005 | Shimizu et al. |
| 2005/0066423 A1 | 3/2005 | Hogan |
| 2005/0198874 A1 | 9/2005 | Wurm |
| 2005/0225155 A1 | 10/2005 | Nakahara |
| 2005/0238842 A1 | 10/2005 | Schindzielorz et al. |
| 2006/0068120 A1 | 3/2006 | Sreenivasan et al. |
| 2006/0075615 A1 | 4/2006 | Khambete |
| 2006/0116045 A1* | 6/2006 | Nishibori ............... B29C 48/06 442/352 |
| 2006/0141221 A1 | 6/2006 | Sasaki |
| 2006/0198983 A1 | 9/2006 | Patel |
| 2006/0237986 A1 | 10/2006 | Brockschneider et al. |
| 2007/0001336 A1 | 1/2007 | Nishibori et al. |
| 2007/0057414 A1 | 3/2007 | Hartge |
| 2007/0066197 A1 | 3/2007 | Woo et al. |
| 2007/0134464 A1 | 6/2007 | Schindzielorz et al. |
| 2007/0207691 A1 | 9/2007 | Cobbett Wiles et al. |
| 2008/0018162 A1 | 1/2008 | Galbreath et al. |
| 2008/0048474 A1 | 2/2008 | Pedde et al. |
| 2008/0099458 A1 | 5/2008 | Hilmer |
| 2008/0102149 A1 | 5/2008 | Williams |
| 2008/0203615 A1 | 8/2008 | Brum |
| 2008/0252111 A1 | 10/2008 | Rothkop et al. |
| 2008/0254281 A1 | 10/2008 | Chen et al. |
| 2008/0309143 A1 | 12/2008 | Booth et al. |
| 2009/0008377 A1 | 1/2009 | Nathan et al. |
| 2009/0064471 A1 | 3/2009 | Santin et al. |
| 2009/0085384 A1 | 4/2009 | Galbreath et al. |
| 2009/0108494 A1 | 4/2009 | Ito et al. |
| 2009/0127912 A1 | 5/2009 | Galbreath et al. |
| 2009/0152909 A1 | 6/2009 | Andersson |
| 2009/0191395 A1 | 7/2009 | Noelle et al. |
| 2009/0191779 A1 | 7/2009 | Cree |
| 2009/0269570 A1 | 10/2009 | Takaoka |
| 2009/0269571 A1 | 10/2009 | Takaoka |
| 2009/0311495 A1 | 12/2009 | Squires et al. |
| 2010/0181796 A1 | 7/2010 | Galbreath et al. |
| 2010/0258334 A1 | 10/2010 | Akaike et al. |
| 2011/0084537 A1 | 4/2011 | Lin et al. |
| 2011/0252568 A1 | 10/2011 | Ramp |
| 2011/0278902 A1 | 11/2011 | Galbreath et al. |
| 2011/0316185 A1 | 12/2011 | Takaoka |
| 2012/0042452 A1 | 2/2012 | Takaoka |
| 2012/0104646 A1 | 5/2012 | Takaoka |
| 2012/0112515 A1 | 5/2012 | Labish |
| 2012/0174352 A1 | 7/2012 | Tsunoda |
| 2012/0180939 A1 | 7/2012 | Takaoka |
| 2012/0181841 A1 | 7/2012 | Petzel et al. |
| 2012/0235461 A1 | 9/2012 | Rosenbrock et al. |
| 2012/0301701 A1 | 11/2012 | Takaoka |
| 2012/0319323 A1 | 12/2012 | Takaoka |
| 2012/0328722 A1 | 12/2012 | Takaoka |
| 2013/0000043 A1 | 1/2013 | Bullard et al. |
| 2013/0020016 A1 | 1/2013 | Takaoka |
| 2013/0137330 A1 | 5/2013 | Grimm |
| 2013/0161858 A1 | 6/2013 | Sasaki |
| 2013/0164123 A1 | 6/2013 | Helmenstein |
| 2013/0189472 A1 | 7/2013 | Takaoka |
| 2013/0200661 A1 | 8/2013 | Klusmeier et al. |
| 2014/0029900 A1 | 1/2014 | Logan, Jr. et al. |
| 2014/0035191 A1* | 2/2014 | Takaoka ............... D04H 3/011 264/210.8 |
| 2014/0037907 A1 | 2/2014 | Takaoka |
| 2014/0037908 A1 | 2/2014 | Takaoka |
| 2014/0042792 A1 | 2/2014 | Kajiwara |
| 2014/0062161 A1 | 3/2014 | Elenbaas et al. |
| 2014/0138016 A1 | 5/2014 | Takaoka |
| 2014/0167328 A1 | 6/2014 | Petzel |
| 2014/0354029 A1 | 12/2014 | Takaoka |
| 2014/0370769 A1 | 12/2014 | Osaki |
| 2014/0378015 A1 | 12/2014 | Osaki |
| 2015/0072107 A1 | 3/2015 | Fujita et al. |
| 2015/0091209 A1 | 4/2015 | Mueller et al. |
| 2015/0158213 A1 | 6/2015 | Mogi et al. |
| 2015/0183349 A1 | 7/2015 | Oberle et al. |
| 2015/0197056 A1 | 7/2015 | Takaoka |
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 | 10/2015 | Noguchi et al. |
| 2015/0274048 A1 | 10/2015 | Mogi et al. |
| 2015/0284894 A1 | 10/2015 | Takaoka |
| 2015/0367583 A1 | 12/2015 | Blot et al. |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052066 A1 | 2/2016 | Chou et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0193755 A1 | 7/2016 | Humfeld |
| 2016/0263802 A1 | 9/2016 | Takaoka |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |

(56) References Cited

U.S. PATENT DOCUMENTS

| | | |
|---|---|---|
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0148312 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0053634 A1 | 2/2019 | Chirackal et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0241104 A1 | 8/2019 | Kondrad et al. |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0193221 A1 | 6/2020 | Aftab et al. |
| 2020/0231428 A1 | 7/2020 | Migneco et al. |
| 2020/0262323 A1 | 8/2020 | Robinson et al. |
| 2020/0315365 A1 | 10/2020 | Kondo et al. |
| 2020/0332445 A1 | 10/2020 | Taninaka et al. |
| 2020/0360210 A1 | 11/2020 | Zoni, III et al. |
| 2021/0024155 A1 | 1/2021 | Primeaux et al. |
| 2021/0046731 A1 | 2/2021 | Nishikawa et al. |
| 2021/0054549 A1 | 2/2021 | Takaoka |
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0188138 A1 | 6/2021 | Powell et al. |
| 2021/0221266 A1 | 7/2021 | Kozlowski et al. |
| 2021/0237632 A1 | 8/2021 | Upendram et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |
| 2022/0169554 A1 | 6/2022 | Du Moulinet D'Hardemare et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322135 A1 | 10/2023 | Hallock et al. |
| 2023/0322136 A1 | 10/2023 | Wang et al. |
| 2023/0339374 A1 | 10/2023 | Abdella et al. |
| 2024/0010108 A1 | 1/2024 | Hallock et al. |
| 2024/0066824 A1 | 2/2024 | Cluet et al. |
| 2024/0133078 A1 | 4/2024 | Hirano et al. |

FOREIGN PATENT DOCUMENTS

| | | |
|---|---|---|
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 102011686 A | 4/2011 |
| CN | 202509164 U | 10/2012 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 104582538 B | 9/2016 |
| CN | 104080959 B | 2/2017 |
| CN | 106387295 A | 2/2017 |
| CN | 106458070 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109680413 A | 4/2019 |
| CN | 110316033 A | 10/2019 |
| CN | 107614238 B | 2/2020 |
| CN | 107208339 B | 6/2020 |
| CN | 107532357 B | 8/2020 |
| CN | 106231959 B | 10/2020 |
| CN | 111989430 A | 11/2020 |
| CN | 112020578 A | 12/2020 |
| CN | 107708493 B | 1/2021 |
| CN | 112192846 A | 1/2021 |
| CN | 107208340 B | 2/2021 |
| CN | 109552123 A | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| CN | 117043246 A | 11/2023 |
| CN | 118748961 A | 10/2024 |
| DE | 2240769 A1 | 3/1973 |
| DE | 2626748 A1 | 2/1979 |
| DE | 3127303 A1 | 1/1983 |
| DE | 3037834 C2 | 5/1987 |
| DE | 3690196 C1 | 10/1989 |
| DE | 3920529 C1 | 8/1990 |
| DE | 4214389 A1 | 11/1993 |
| DE | 29822649 U1 | 4/1999 |
| DE | 20100848 U1 | 3/2001 |
| DE | 102004053133 A1 | 5/2006 |
| DE | 202006017670 U1 | 7/2007 |
| DE | 102006020306 A1 | 11/2007 |
| DE | 102008033468 A1 | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102020127913 A1 | 6/2021 |
| DE | 102021129112 A1 | 10/2022 |
| DE | 102022107559 A1 | 10/2022 |
| DE | 112022005732 T5 | 10/2024 |
| DK | 1832675 T3 | 6/2013 |
| DK | 2772576 T3 | 5/2015 |
| DK | 3255192 T3 | 3/2020 |
| DK | 202370024 A1 | 2/2024 |
| DK | 202370025 A1 | 2/2024 |
| DK | 202370028 A1 | 2/2024 |
| DK | 202370029 A1 | 2/2024 |
| DK | 202370197 A1 | 2/2024 |
| DK | 202370420 A1 | 8/2024 |
| DK | 202370426 A1 | 8/2024 |
| EP | 0240388 A2 | 10/1987 |
| EP | 0145603 B1 | 4/1988 |
| EP | 0370991 A2 | 5/1990 |
| EP | 0392568 A1 | 10/1990 |
| EP | 0459365 A1 | 12/1991 |
| EP | 0805064 A2 | 11/1997 |
| EP | 0890430 A2 | 1/1999 |
| EP | 0926302 A2 | 6/1999 |
| EP | 0894885 B1 | 11/2002 |
| EP | 1586687 A1 | 10/2005 |

(56) References Cited

FOREIGN PATENT DOCUMENTS

| | | |
|---|---|---|
| EP | 1082480 B1 | 12/2009 |
| EP | 1270787 B1 | 6/2010 |
| EP | 2230132 A1 | 9/2010 |
| EP | 1858944 B1 | 7/2011 |
| EP | 2417876 A1 | 2/2012 |
| EP | 2532502 A1 | 12/2012 |
| EP | 2565304 A1 | 3/2013 |
| EP | 1832675 B1 | 4/2013 |
| EP | 1683446 B1 | 7/2013 |
| EP | 2774807 A2 | 9/2014 |
| EP | 2489770 B1 | 1/2015 |
| EP | 2772576 B1 | 4/2015 |
| EP | 2653598 B1 | 7/2016 |
| EP | 3210487 A1 | 8/2017 |
| EP | 2792776 B1 | 10/2017 |
| EP | 2792775 B1 | 11/2017 |
| EP | 2848721 B1 | 1/2018 |
| EP | 3305500 A1 | 4/2018 |
| EP | 2751312 B1 | 7/2018 |
| EP | 3064627 B1 | 8/2018 |
| EP | 3064628 B1 | 8/2018 |
| EP | 2894246 B1 | 10/2018 |
| EP | 2966206 B1 | 11/2018 |
| EP | 3441258 A1 | 2/2019 |
| EP | 3256632 B1 | 3/2019 |
| EP | 3255192 B1 | 1/2020 |
| EP | 3779017 A1 | 2/2021 |
| EP | 3826820 A1 | 6/2021 |
| EP | 3889332 A1 | 10/2021 |
| EP | 3610760 B1 | 11/2021 |
| EP | 3974572 A1 | 3/2022 |
| EP | 4440877 A2 | 10/2024 |
| ES | 2335962 A1 | 4/2010 |
| ES | 2335962 B1 | 4/2010 |
| ES | 2346180 T3 | 10/2010 |
| FR | 2432108 A1 | 2/1980 |
| FR | 2486922 A3 | 1/1982 |
| FR | 2596626 A1 | 10/1987 |
| FR | 2675440 B1 | 12/1993 |
| FR | 2850260 A1 | 7/2004 |
| FR | 3050409 B1 | 10/2017 |
| FR | 3063461 B1 | 3/2019 |
| FR | 3109753 B1 | 11/2021 |
| GB | 721866 | 1/1955 |
| GB | 721866 A | 1/1955 |
| GB | 1009799 A | 10/1964 |
| GB | 2275695 A | 9/1994 |
| GB | 2576141 A | 2/2020 |
| GB | 2577591 B | 4/2021 |
| GB | 2589497 B | 11/2021 |
| GB | 2607058 A | 11/2022 |
| GB | 2628886 A | 10/2024 |
| IN | 201717042989 A | 3/2018 |
| IN | 336480 B | 5/2020 |
| IN | 202047045846 A | 10/2020 |
| IN | 351780 B | 11/2020 |
| IN | 382056 B | 11/2021 |
| IN | 202117027707 A | 11/2021 |
| JP | S556515 A | 1/1980 |
| JP | S5517527 A | 2/1980 |
| JP | S62128739 A | 6/1987 |
| JP | H04286627 A | 10/1992 |
| JP | H05211909 A | 8/1993 |
| JP | H05220764 A | 8/1993 |
| JP | H07300760 A | 11/1995 |
| JP | H0856712 A | 3/1996 |
| JP | H0861413 A | 3/1996 |
| JP | H0861414 A | 3/1996 |
| JP | H0874161 A | 3/1996 |
| JP | H1046185 A | 2/1998 |
| JP | H10128890 A | 5/1998 |
| JP | H10248685 A | 9/1998 |
| JP | H115282 A | 1/1999 |
| JP | H1148275 A | 2/1999 |
| JP | H11123757 A | 5/1999 |
| JP | H11350326 A | 12/1999 |
| JP | 2000004993 A | 1/2000 |
| JP | 2001046185 A | 2/2001 |
| JP | 2001055719 A | 2/2001 |
| JP | 2001061607 A | 3/2001 |
| JP | 2001061612 A | 3/2001 |
| JP | 2001070106 A | 3/2001 |
| JP | 2001310378 A | 11/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003250667 A | 9/2003 |
| JP | 2003251089 A | 9/2003 |
| JP | 2003268668 A | 9/2003 |
| JP | 2004202858 A | 7/2004 |
| JP | 3589307 B2 | 11/2004 |
| JP | 3686690 B2 | 8/2005 |
| JP | 3686692 B2 | 8/2005 |
| JP | 2006006924 A | 1/2006 |
| JP | 2006200117 A | 8/2006 |
| JP | 2006200119 A | 8/2006 |
| JP | 2006200120 A | 8/2006 |
| JP | 2007098013 A | 4/2007 |
| JP | 4181878 B2 | 11/2008 |
| JP | 2009090089 A | 4/2009 |
| JP | 4350285 B2 | 10/2009 |
| JP | 4350286 B2 | 10/2009 |
| JP | 4350287 B2 | 10/2009 |
| JP | P4347647 B2 | 10/2009 |
| JP | 2010524569 A | 7/2010 |
| JP | 2011045424 A | 3/2011 |
| JP | 2011152779 A | 3/2011 |
| JP | 2011177413 A | 9/2011 |
| JP | 4835150 B2 | 12/2011 |
| JP | 4907991 B2 | 4/2012 |
| JP | 2012115515 A | 6/2012 |
| JP | 5165809 B1 | 3/2013 |
| JP | 2013091862 A | 5/2013 |
| JP | 5339107 B1 | 11/2013 |
| JP | 5418741 B1 | 2/2014 |
| JP | 2014038151 A | 2/2014 |
| JP | 5454733 B1 | 3/2014 |
| JP | 5454734 B1 | 3/2014 |
| JP | 201464767 A | 4/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2016189879 A | 3/2015 |
| JP | 2015205611 A | 11/2015 |
| JP | 5868964 B2 | 2/2016 |
| JP | 2016028900 A | 3/2016 |
| JP | 2016036972 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 6182249 B2 | 8/2017 |
| JP | 2017150100 A | 8/2017 |
| JP | 6228278 B2 | 11/2017 |
| JP | 2017196142 A | 11/2017 |
| JP | 2018027163 A | 2/2018 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 2020127523 A | 2/2019 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A | 12/2019 |
| JP | 6661666 B2 | 3/2020 |
| JP | 2020045589 A * | 3/2020 |

(56) References Cited

FOREIGN PATENT DOCUMENTS

| | | |
|---|---|---|
| JP | 2020090648 A | 6/2020 |
| JP | 6725823 B2 | 7/2020 |
| JP | 2020156629 A | 10/2020 |
| JP | 6786500 B2 | 11/2020 |
| JP | 2020192164 A | 12/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 20090035561 A | 4/2009 |
| KR | 101141773 B1 | 5/2012 |
| KR | 101250622 B1 | 4/2013 |
| KR | 20130067823 A | 6/2013 |
| KR | 20170017488 A | 8/2015 |
| KR | 101717488 B1 | 3/2017 |
| KR | 101722929 B1 | 4/2017 |
| KR | 101722932 B1 | 4/2017 |
| KR | 101756629 B1 | 7/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| KR | 20220034241 A | 3/2022 |
| NL | 1032699 C2 | 4/2008 |
| SE | 524231 C2 | 7/2004 |
| WO | 1992018224 A1 | 10/1992 |
| WO | 1995015768 A1 | 6/1995 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A | 2/2004 |
| WO | 2004063450 A1 | 7/2004 |
| WO | 2005030011 A1 | 4/2005 |
| WO | 2006068120 A1 | 6/2006 |
| WO | 2008016770 A1 | 2/2008 |
| WO | 2009092153 A1 | 7/2009 |
| WO | 2010048515 A1 | 4/2010 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |
| WO | 2017199474 A1 | 11/2017 |
| WO | 2018068451 A1 | 4/2018 |
| WO | 2019036559 A1 | 2/2019 |
| WO | 2019166691 A1 | 9/2019 |
| WO | 2019188090 A1 | 10/2019 |
| WO | 2019230304 A1 | 12/2019 |
| WO | 2020021263 A1 | 1/2020 |
| WO | 2020045589 A1 | 3/2020 |
| WO | 2020090648 A1 | 5/2020 |
| WO | 2020111110 A1 | 6/2020 |
| WO | 2020116327 A1 | 6/2020 |
| WO | 2020245670 A1 | 12/2020 |
| WO | 2021074601 A1 | 4/2021 |
| WO | 2021122937 A1 | 6/2021 |
| WO | 2021141601 A1 | 7/2021 |
| WO | 2022097435 A1 | 5/2022 |
| WO | 2023071240 A1 | 5/2023 |
| WO | 2023101995 A2 | 6/2023 |
| WO | 2023122018 A2 | 6/2023 |
| WO | 2023172483 A1 | 9/2023 |
| WO | 2023204905 A1 | 10/2023 |
| WO | 2024136943 A1 | 10/2023 |
| WO | 2023218805 A1 | 11/2023 |
| WO | 2023220261 A1 | 11/2023 |
| WO | 2023244721 A1 | 12/2023 |
| WO | 2023244727 A1 | 12/2023 |
| WO | 2023244758 A1 | 12/2023 |
| WO | 2023249895 A1 | 12/2023 |
| WO | 2023250026 A1 | 12/2023 |
| WO | 2024006134 A1 | 1/2024 |
| WO | 2024006143 A1 | 1/2024 |
| WO | 2024097012 A1 | 5/2024 |

OTHER PUBLICATIONS https://www.youtube.com/watch?v=eFiPBu_fBe4, The Making of a Newton Wovenaire Crib Mattress, Apr. 21, 2016, 3 pages.
http://airstring.com, Introducing Airstring The Future of Cushioning, 2016, 13 pages.
International Searching Authority; Invitation to Pay Additional Fees and Where Applicable, Protest Fees, PCTUS2023/021869, mailed Jul. 14, 2023, 4 pages.
Invitation to Pay Additional Fees for Application No. PCT/US22/53366, dated Mar. 9, 2023, 2 pages.
International Search Report and Written Opinion for Application No. PCT/US22/53366, dated Jun. 15, 2023, 12 pages.
airstring.com, About Airstring, Jan. 18, 2021, 13 pages.
https://www.toyobo-global.com/seihin/breathair/breathair_youto.htm, Applications, Sep. 10, 2019, 5 pages.
https://www.toyobo-global.com/seihin/breathair_youto_htm, Toyobo Breathair, Cushion Materials, 1996-2013, 3 pages.
https://www.youtube.com/watch?v=eFiPBu_fBe4, The Making of a Newton Wovenaire Crib Mattress—YouTube, 3 Pages, Apr. 21, 2016.
www.newtonbaby.com pages design, Borninwater, designed to breathe, Jan. 28, 2021, 11 pages.

* cited by examiner

TOOL TO MANUFACTURE A CUSHION

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
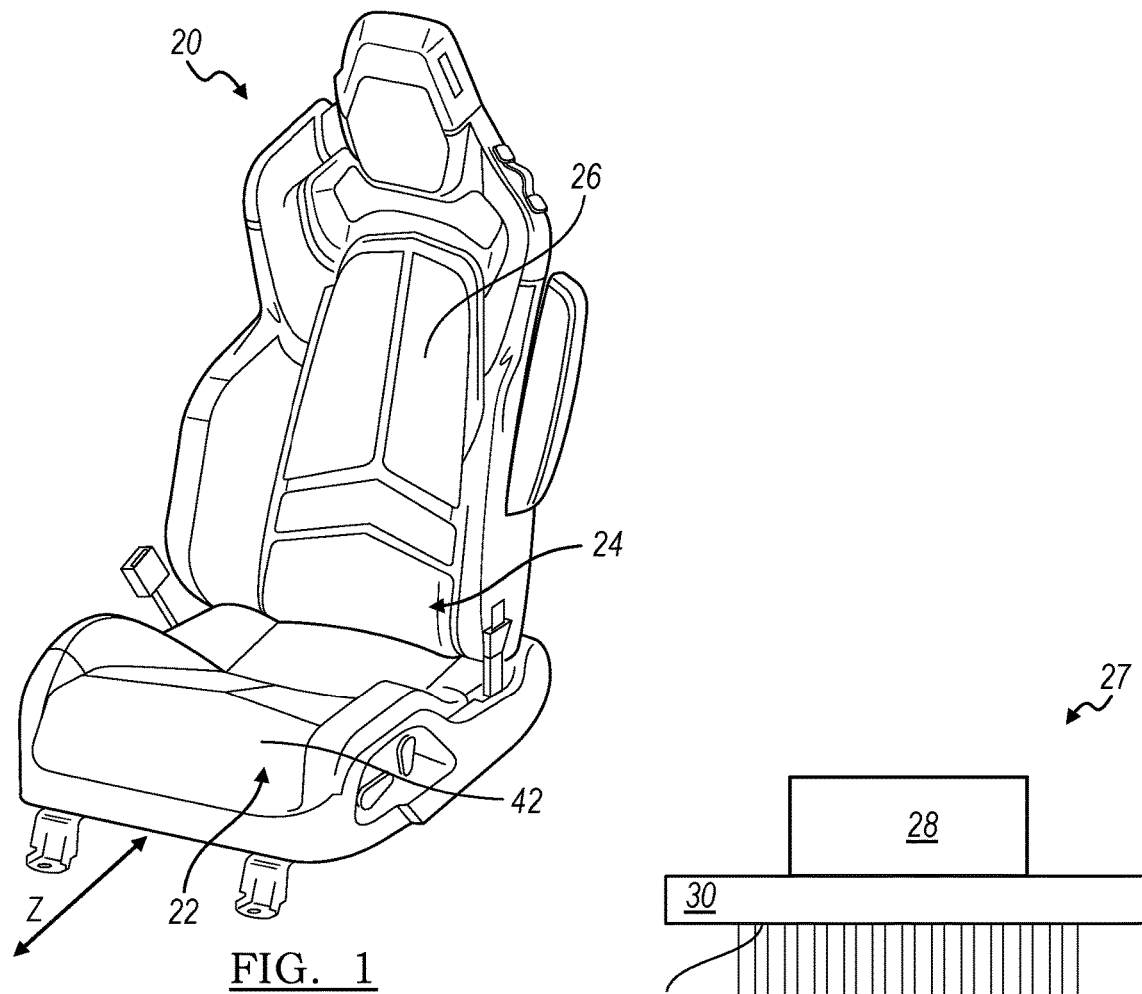
FIG. 1 is a front perspective view of a vehicle seat assembly according to an embodiment.

FIG. 1 illustrates a seat assembly 20 as a vehicle seat assembly 20 according to an embodiment. Although the vehicle seat assembly 20 is illustrated and described, any seat assembly 20 may be employed. The seat assembly 20 may be utilized in a land vehicle, aircraft, watercraft, or the like. The seat assembly 20 may also be utilized as an office chair, comfort chair, or the like.

The depicted seat assembly 20 includes a seat bottom cushion 22 to support a pelvis and thighs of a seated occupant. The seat assembly 20 also includes a seat back cushion 24 to support a back and shoulders of the seated occupant. A trim cover 26 is provided over the seat cushions 22, 24 to conceal the cushions 22, 24 and provide a uniform and smooth contact surface for the occupant.

Figure 2:
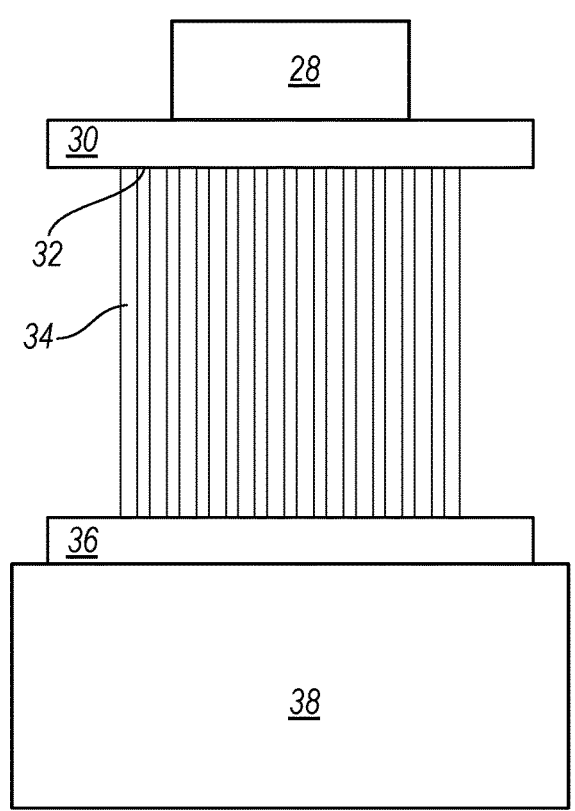
FIG. 2 is a front elevation schematic view of a system to manufacture a seat cushion of the seat assembly of FIG. 1.

Referring now to FIG. 2, the seat cushions 22, 24 are manufactured from a system 27 and a process of extruded thermoplastic resin mesh. In the depicted embodiment, an extruder 28 provides a pressurized molten thermoplastic resin to an extrusion die 30. The extrusion die 30 is arranged with a plurality of outlet ports or nozzles 32 to dispense a plurality of strands 34 of the molten thermoplastic resin. The strands 34 are dispensed through a tool 36 and into a fluid chamber 38. The tool 36 guides the strands 34 into the fluid chamber 38. The fluid chamber 38 may retain a fluid to resist and cool the strands 34, such as a water. The fluid chamber 38 resists a flow of the strands 34, thereby causing the strands 34 to buckle, loop, and intersect with adjacent strands 34 within a profile defined by the tool 36. The strands 34 may also expand and float within the fluid chamber 38. The strands 34 are cooled in the fluid chamber 38 by the fluid to form a unitary non-woven thermoplastic cushion 22. According to this process the non-woven thermoplastic cushion 22 is resisted, cooled, and solidified by the fluid.

Figure 3:
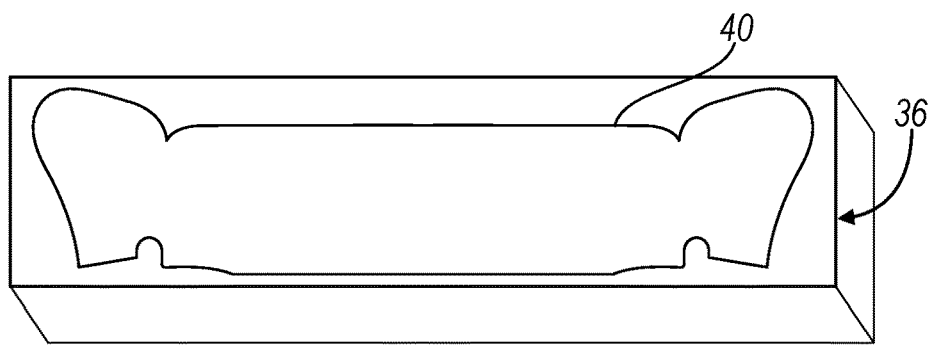
FIG. 3 is a top perspective view of a tool plate of the system of FIG. 2 according to an embodiment.
Figure 4:
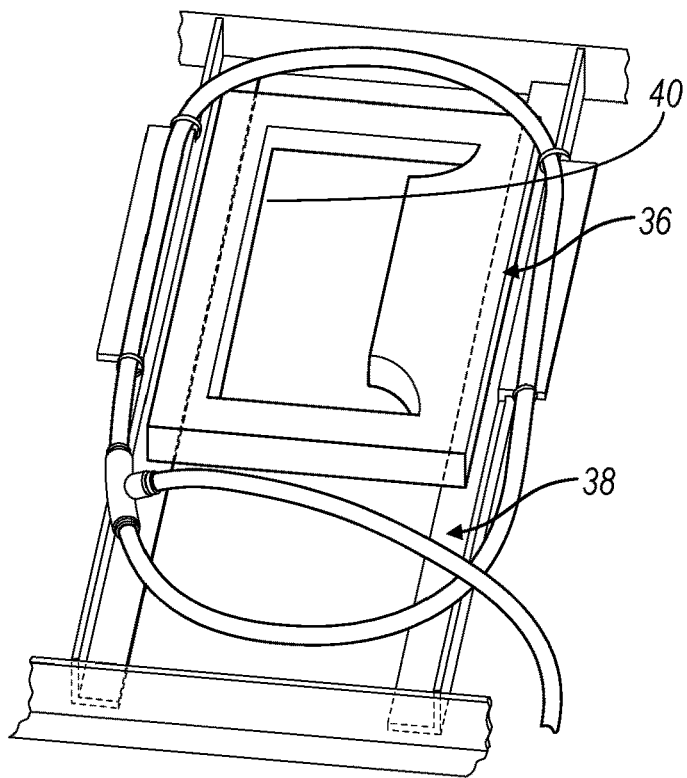
FIG. 4 is a partial top perspective view of the system of FIG. 2.

FIGS. 3 and 4 illustrate the tool 36 as a plate 36, referred to as a funnel plate 36. An aperture 40 is formed through the plate 36 to guide and funnel the strands 34 of thermoplastic resin into the cooling chamber 38. The through aperture 40 is sized to match an overall profile or perimeter of the seat bottom cushion 22 when viewed in a fore and aft direction, labeled Z in FIG. 1. Therefore, the molten resin strands 34 are collected, guided, and cooled into a cushion 22 with an overall profile of the seat cushion 22. The plate 36 shapes the mesh of molten resin strands 34 into the overall profile of the cushion 22 as the strands 34 buckle, loop, and intersect. The plate 36 shapes the mesh before the mesh solidifies into the non-woven mesh assembly of the cushion 22.

The through aperture 40 is provided with curvature to form the non-woven cushion 22 with curvature. For example, the through aperture 40 has an overall convex profile to form a concave surface 42 on a top surface of the cushion 22 as a central seating surface. The through aperture 40 may also include a fillet or chamfer about the aperture 40 at an input end of the plate 36. The fillet may have a radius of at least twelve millimeters, or the chamfer may be sized twelve millimeters by twelve millimeters. The fillet or chamfer provide a leading edge about the aperture 40 to guide the strands 34 into the plate aperture 40.

Seat cushions 22, 24 are often molded from a foam material. Foam cushions require dedicated tooling to mold each cushion component. In contrast to prior art mold tooling, the seat cushion 22 includes a dedicated tooling plate 36. The system 27 includes flexible equipment suitable for fabricating various cushions with various tooling plates. The extrusion die 30 includes a plurality of nozzles 32 that exceed an overall area of the through aperture 40. When utilized with the tool plate 36, the nozzles that are outside of the perimeter of the through aperture 40 are closed so that the extruded strands 34 are dispensed into the aperture 40 only. The closed or open operation of each nozzle 32 can be adjusted for each tooling plate 36.

The tooling plate 36 induces a shape upon the cushion 22 before the strands 34 cool, cure, and solidify into the non-woven mesh cushion material. Secondary forming processes to create shape, contour, seating surfaces, and connection surfaces can be eliminated. The cushion 22 is cut from the otherwise continuous formed mesh assembly. Alternatively, the cushion 22 may be formed from a plurality of mesh assembly segments with a sequentially transitioning overall profile, which are combined within the trim cover 26. The segments may be glued or otherwise fastened together.

Figure 5:
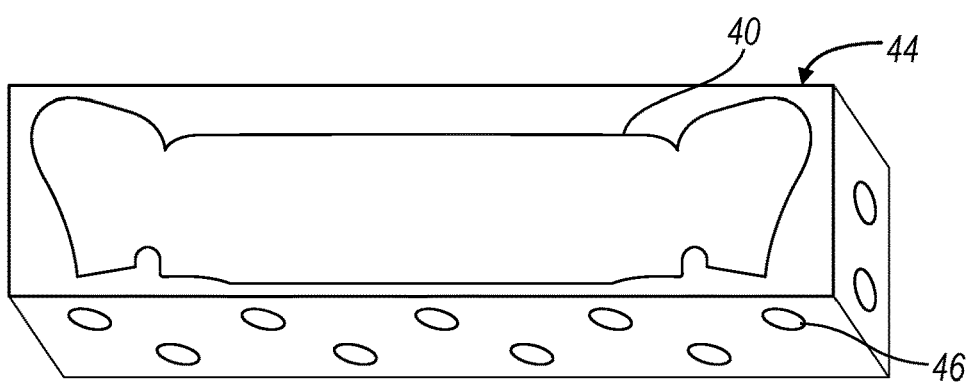
FIG. 5 is a top perspective view of a tool mold of the system of FIG. 2 according to an embodiment.

The tooling plate 36 may have a suitable thickness beyond twelve millimeters. For example, the tooling plate 36 may have a thickness of at least one inch. With reference now to FIG. 5, the tool 36 may be a tunnel mold 44 with a greater thickness than the tooling plate 36. For the depicted example, the mold 44 has a thickness of six inches. The mold 44 includes the through aperture 40 formed through the mold 44 in the thickness direction to guide the molten thermoplastic resin strands 34 into the fluid chamber 38.

The mold 44 also includes a plurality of cooling passages 46 formed into a body of the mold 44. The cooling passages 46 extend toward the through aperture 40 to permit coolant to cool the mold 44 and consequently the mesh material within the cavity of the aperture 40. The mold 44 may extend into the fluid of the chamber 38 so that the mold 44 is cooled by the fluid of the chamber 38 and so that the fluid is also disposed within the aperture 40 to cool and form the non-woven mesh. Cooling of the mold 44 begins the cooling of the mesh strands 34 and forming of the shape of the cushion 22 while the strands 34 and fluid are within the cavity of the aperture 40 of the mold 44. Cooling of the mold 44 also maintains the mold 44 at a suitable temperature for repeated molding cycles for multiple mesh assemblies. According to an embodiment, the cooling passages 46 do not intersect with the through aperture 40. According to another embodiment, the cooling passages 46 intersect with the through aperture 40 to permit the fluid to pass from the cooling passages to the cavity within the through aperture 40.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a vehicle seat cushion, comprising:
    providing a tooling plate on a vehicle seat manufacturing system, wherein the tooling plate is selected from a plurality of tooling plates, based on a desired shape of a vehicle seat bottom cushion, wherein the tooling plate is replaced with another tooling plate according to the desired shape of the vehicle seat bottom cushion;
    dispensing, through the tooling plate, a plurality of strands of a molten thermoplastic resin, wherein the tooling plate is a 3-dimensional shaped mold comprising a plurality of cooling passages and an aperture formed through the three dimensional shaped mold of the tooling plate, and wherein the aperture of the tooling plate is of a shape that matches a contour of an overall perimeter of the vehicle seat bottom cushion;
    facilitating a flow of the plurality of strands through the tooling plate while restricting the flow of the plurality of strands within the contour of the tooling plate that matches the overall perimeter of the vehicle seat bottom cushion and shaping the plurality of strands into the contour of the tooling plate; and
    passing a coolant through the plurality of cooling passages after shaping the plurality of strands into a meshed shape corresponding to the shape of the contour of the tooling plate, wherein the plurality of cooling passages extends towards the aperture of the tooling plate to cool the plurality of strands within the contour of the tooling plate,
    wherein the plurality of strands is buckled by resisting the flow of the plurality of strands within a profile defined by the contour of the tooling plate, the buckled strands intersecting as a unitary non-woven body in a shape of the overall perimeter of the vehicle seat bottom cushion.

2. The method of claim 1, further comprising cooling the plurality of strands as the unitary non-woven body.

3. The method of claim 1, further comprising:
    dispensing the molten thermoplastic resin from a plurality of nozzles, the plurality of nozzles, collectively, comprising an area greater than the area of the aperture; and
    closing a subset of the plurality of nozzles outside the area of the aperture, wherein each of the plurality of nozzles is selectively actuated to either of open or closed position so as to dispense the plurality of strands in a pattern that matches the profile defined by the contour of the tooling plate and resist the flow of the plurality of strands within the contour of the tooling plate.

4. The method of claim 1, wherein the plurality of cooling passages through the mold cools the unitary non-woven body.

5. The method of claim 4, further comprising placing the mold in a cooling fluid, the cooling fluid cooling the unitary non-woven body.

6. The method of claim 1, wherein the tooling plate comprises a one of fillet or chamfer at an input end of the tooling plate, and wherein the radius of the fillet is twelve millimeters, and at least one dimension of the chamfer is twelve millimeters.

7. The method of claim 1, wherein the thickness of the tooling plate is one inch.

8. The method of claim 1, wherein the tooling plate comprises a first wall, a second wall, a third wall and a fourth wall, and
    wherein the first wall and the second wall correspond to a top surface and a bottom surface of the vehicle seat bottom cushion, and the third wall and the fourth wall correspond to side walls of the vehicle seat bottom cushion.

9. The method of claim 1, wherein the plurality of cooling passages is formed on side walls of the tooling plate, the side walls extending from the aperture of the tooling plate towards a distal end of the tooling plate, and wherein the coolant is passed through the plurality of cooling passages on the side walls to facilitate cooling of the plurality of strands shaped within the contour of the aperture of the tooling plate.

* * * * *